United States Patent [19]
Herderich et al.

[11] Patent Number: 6,081,111
[45] Date of Patent: Jun. 27, 2000

[54] RPM-MEASURING SYSTEM WITH A REVOLVING AREAWIDE MAGNETIZED ROTOR DISPOSED ON A MAGNETIZABLE SUPPORT

[75] Inventors: Hans-Juergen Herderich, Kernen, Germany; Craig McCarthy, Anderson, S.C.

[73] Assignee: Robert Bosch GmbH, Stuttgart, Germany

[21] Appl. No.: 08/983,594

[22] PCT Filed: Nov. 27, 1996

[86] PCT No.: PCT/DE96/02272

§ 371 Date: Aug. 5, 1998

§ 102(e) Date: Aug. 5, 1998

[87] PCT Pub. No.: WO97/49995

PCT Pub. Date: Dec. 31, 1997

[30] Foreign Application Priority Data

Jun. 26, 1996 [DE] Germany .......................... 196 25 489

[51] Int. Cl.⁷ .............................. G01P 3/488; F16C 41/04
[52] U.S. Cl. ............................................. 324/174; 384/448
[58] Field of Search ...................................... 324/173, 174, 324/207.22, 207.15, 207.23, 207.25; 384/446, 448

[56] References Cited

U.S. PATENT DOCUMENTS 5,614,822  3/1997  Sakamoto et al. ...................... 324/174

FOREIGN PATENT DOCUMENTS 0213732     3/1987   European Pat. Off. ............... 324/174
0320322     6/1989   European Pat. Off. ............... 324/174
0 518 157 A1 12/1992 European Pat. Off. .

*Primary Examiner*—Jay Patidar
*Attorney, Agent, or Firm*—Michael J. Striker

[57] ABSTRACT

An rpm-measuring system with at least one sensor disposed in a motor vehicle on a wheel support arranged at a distance from a component to form a gap between the wheel support and the component, includes at least one magnetized rotor attachable to a motor vehicle wheel or a rotating component, so that the rotor is magnetically shielded from dirt pollution by magnetizable particles or flakes, and a magnetizable support on which the rotor is disposed and which has a back facing the gap between the wheel support or the to cover the gap and to shield the rotor from magnetizable dirt.

6 Claims, 1 Drawing Sheet

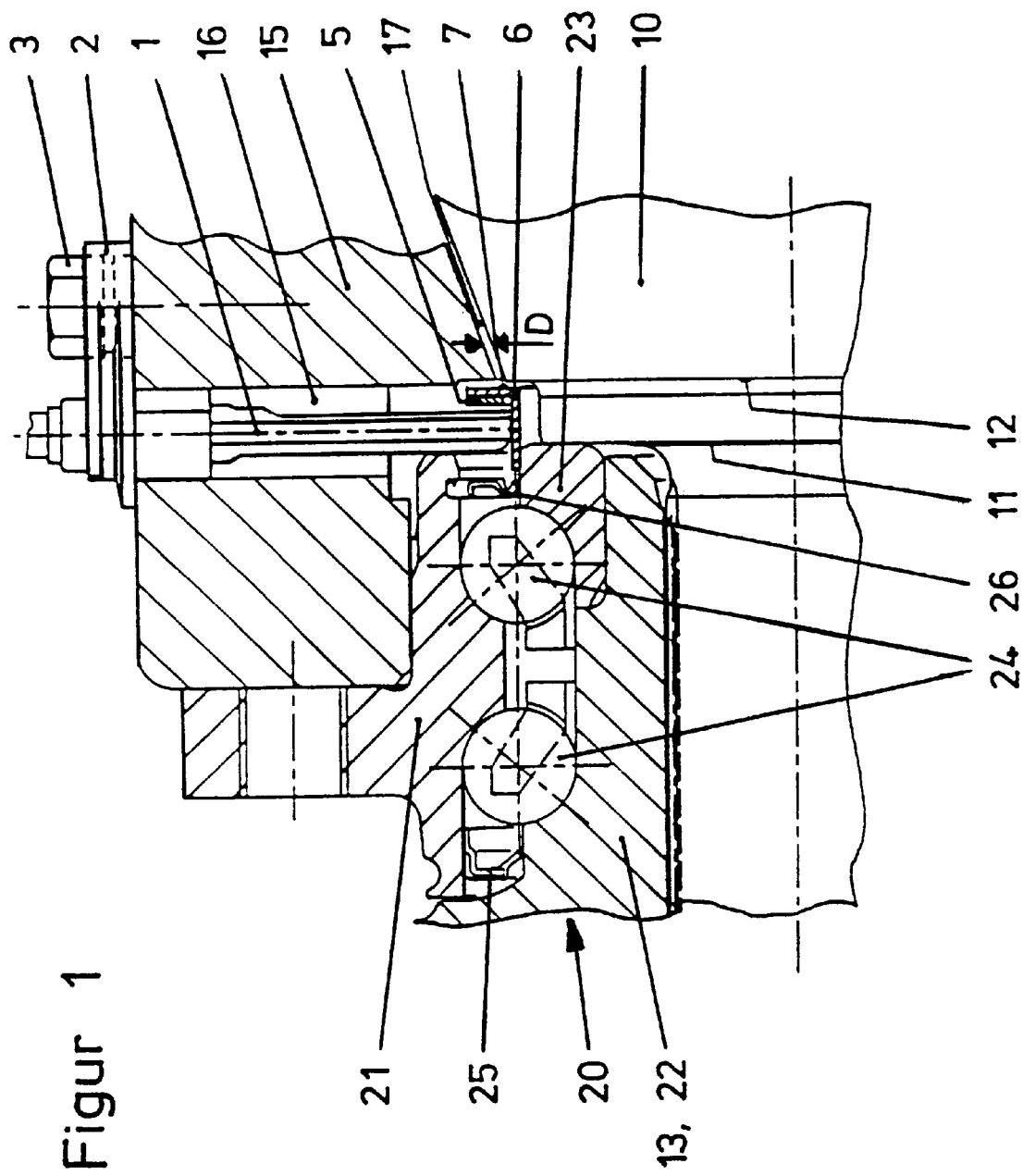
Figur 1

RPM-MEASURING SYSTEM WITH A REVOLVING AREAWIDE MAGNETIZED ROTOR DISPOSED ON A MAGNETIZABLE SUPPORT

BACKGROUND OF THE INVENTION

The invention relates to an rpm-measuring system with a revolving, areawise magnetized rotor, integrated into a wheel seat of a motor vehicle.

A similar object for example is known from EP 0 518 157 A1. An rpm-measuring system is described there, whose sensor and magnetized rotor are installed on an anti-friction bearing. The revolving outer ring of the anti-friction bearing has the magnetized rotor on one of its end faces. The sensor is disposed opposite the rotor in the axial direction. In this case, the former is fastened inside a ring, which is attached to the inner ring of the anti-friction bearing. For this purpose it has a profile which, on the one hand extends around the sensor, and on the other hand is cantilevered over the outer ring of the anti-friction bearing. Between the edge of the cantilevered section and the cylindrical outer surface of the outer ring of the anti-friction bearing there is a small gap, in front of which a magnet is disposed at a short distance.

The magnet serves the purpose of attracting and collecting magnetic or magnetizable dirt, for example break abrasion and other particles or flakes generated during the normal course of wear and tear, before they reach the magnetized rotor of the rpm-measuring system through the small gap and possibly disturb the effectiveness of the sensor.

SUMMARY OF THE INVENTION

With the subject of the invention, the rotor is disposed on a magnetizable support, whose open back faces the gap between the wheel support and the adjacent and/or opposite wheel hub or shaft component. Since the support is made of a magnetizable material, it becomes magnetized by the rotor arranged on it. In this way its open back has the effect of a magnet. Consequently, the support shields the rotor from magnetizable dirt, which can reach the rotor by way of the gap between the wheel bearing components moved in relation to each other. In this way, at the same effectiveness as cited in the prior art, the subject of the invention requires fewer components, a lighter weight and a smaller structural space.

The rotor, for example a multi-pole ring, magnetically charged in segments, can have a symmetrical form in respect to its rotational axis with almost any contour. For example, it is a ring whose cylindrical and/or plane contour its magnetized. The support is embodied in accordance with its magnetic direction and the disposition of the sensors. Among others, it thus can be a ring with a cylindrical or plane contact surface for the rotor.

The location of the rotor and its support within the wheel seat can be freely selected. A disposition at the edge of the anti-friction bearing has proven itself as practical.

BRIEF DESCRIPTION OF THE DRAWINGS

Further details of the invention ensue from the dependent claims and the following description of a schematically represented embodiment:

FIG. 1: Section of a motor vehicle wheel seat with an rpm-measuring system.

DESCRIPTION OF THE PREFERRED EMBODIMENT

The rpm-measuring system in accordance with FIG. 1 in this case is integrated into a wheel seat or a motor vehicle drive shaft. A driving wheel, not shown, is seated on a wheel support (15) with the aid of a dual-row angular ball bearing (20), which among others has an outer ring (21) and two inner rings (22, 23). At least one component (13) of the wheel hub of the drive wheel is the outermost inner ring (22), referring to the center of the shaft, of the angular ball bearing (20). This inner ring (22) is seated via notch- or gear-shaft teeth on a drive shaft (10). The inner ring (23) of the angular ball bearing (20) is clamped between the outermost inner ring (22) and a shaft shoulder (11) of the drive shaft (10). The flange-shaped outer ring (21) of the angular ball bearing (20) is bolted to the wheel support (15). The packing rings (25) and (26) of the anti-friction bearing are disposed on both sides of the rolling bodies (24).

An rpm sensor (1) of an anti-blocking system, is seated in a bore (16), aligned almost vertically in relation to the rotational axis of the wheel, in the wheel support (15). The rpm sensor (1) is attached to the wheel support (15) by means of a collar (2) and a hexagon head screw (3). It extends into a hollow space between the anti-friction bearing (20) and a shaft collar (12) of the drive shaft (10). A ring (6) with an angle-shaped partial cross-section is disposed on the inner ring (23) at the cylindrical surface facing its outer ring (21) outside the seal (26) of the anti-friction bearing. This angular ring (6), made of a magnetizable material, is seated with its cylindrical portion on the inner ring (23), for example by way of a transverse press fit or an adhesive connection. The faceplate-shaped portion of the angular ring (6) is oriented toward the sensor axis. On its side, facing the anti-friction bearing (20) and the rpm sensor (1), it has a multi-pole ring (5).

For ease of assembling the angular ring (6), a shaft detent shoulder can be worked into the inner ring (23). As can be seen from the drawing the diameter of the gap (17) increases as the distance increases from the magnetizable support (6). As an alternative to this, an at least areawise revolving detent, for example in form of a bead, can be extruded on the angular ring (6) in the area of its cylindrical portion. This portion, as the case may be, can also have a z-shaped cross-section. These structural measures make an axial detent for the assembly of the angular ring (6) possible.

A gap (17) is located in the area of the back (7) of the angular ring (6) at the level of the multi-pole ring (5) and has a diameter D which increases as the distance from the support (15) increases. The gap (17) is the space between the wheel support (15) and the portion of the drive shaft (10) rotating there, which adjoins the shaft collar (12) in the direction toward the center of the shaft. The joint cover of a homokinetic synchronized joint is often located in this section.

What is claimed is:

1. An rpm-measuring system with at least one sensor disposed in a motor vehicle on a wheel support arranged at a distance from a component to form a gap between the wheel support and the component, said rpm measuring system including at least one magnetized rotor attached to a motor vehicle wheel or its rotating component, and a magnetizable support on which said rotor is disposed and which has a back facing away from said rotor and facing toward the gap between the wheel support and the component so as to cover the gap and to shield said motor from magnetizable particles or flakes.

2. An rpm-measuring system as defined in claim 1, wherein said support is formed as an angular profile-shaped ring.

3. An rpm-measuring system as defined in claim 1; and further comprising an anti-friction bearing arranged on a wheel seat and having rotating outer and inner rings, said support being disposed on at least one of said rings.

4. An rpm-measuring system as defined in claim 3, wherein said maganetizable support is attached by a transverse press fit on a cylindrical surface of said at least one rotating ring of said anti-friction bearing.

5. An rpm-measuring system as defined in claim 1, wherein the gap has a diameter between the wheel support and the component, which diameter increases as a distance increases from said magnetizable support.

6. An rpm-measuring system as defined in claim 1, wherein said magnetizable support is located between said rotor and the gap.

* * * * *